(12) United States Patent
Hoose et al.

(10) Patent No.: US 6,496,622 B1
(45) Date of Patent: Dec. 17, 2002

(54) DIFFRACTIVE STRUCTURE FOR HIGH-DISPERSION WDM APPLICATIONS

(75) Inventors: John Hoose, Fairport; Robert Frankel, Rochester, both of NY (US); Evgeny Popov, Marseille Cedex (FR)

(73) Assignee: Chromaplex, Inc., West Henrietta, NY (US)

( * ) Notice: Subject to any disclaimer, the term of this patent is extended or adjusted under 35 U.S.C. 154(b) by 0 days.

(21) Appl. No.: 09/950,124

(22) Filed: Sep. 10, 2001

Related U.S. Application Data (60) Provisional application No. 60/286,801, filed on Apr. 25, 2001, and provisional application No. 60/300,639, filed on Jun. 25, 2001.

(51) Int. Cl.$^7$ .................................................. G02B 6/34
(52) U.S. Cl. ............................ 385/37; 385/33; 385/36
(58) Field of Search ............................ 385/37, 16, 24, 385/31, 32, 33, 34, 35, 36, 11

(56) References Cited

U.S. PATENT DOCUMENTS

| | | | |
|---|---|---|---|
| 4,475,792 A | 10/1984 | Sica, Jr. ................. | 350/162.17 |
| 4,652,080 A | * 3/1987 | Carter et al. ................... | 385/37 |
| 4,736,360 A | * 4/1988 | McMahon ................ | 385/37 X |
| 4,741,588 A | * 5/1988 | Nicia et al. .................... | 385/37 |
| 6,112,000 A | 8/2000 | Bergmann et al. ............ | 385/47 |
| 6,204,946 B1 | 3/2001 | Aksyuk et al. ............. | 359/131 |

OTHER PUBLICATIONS

M.S.D. Smith and K.A. McGreer, Diffraction Gratings utilizing total internal Reflection facets in Littrow configuration, IEEE Photonics Technology Letters, vol. 11, No. 1, Jan. 1999, pp. 84–86.

Jian–Jun He et al., Monolithic integrated wavelength demultiplexer based on a waveguide Rowland circle grating in InGaAsP/InP, J. Lightwave Techn., vol. 16, No. 4, Apr. 1998, pp. 631–638.

U.U. Graf et al., Fabrication and evaluation of an etched infrared diffraction grating, Applied Optics, vol. 33, No. 1, Jan. 1, 1994.

G. Wiedemann et al., Immersion grating for infrared astronomy, Applied Optics, vol. 32, No. 7, Mar. 1, 1993, pp. 1176–1178.

P. Philippe et al., Wavelength demultiplexer: using echelle gratings on silicon substrate, Applied Optics, vol. 24, No. 7, Apr. 1, 1986, pp. 1006–1011.

Luke D. Keller et al., Design for a near–infrared immersion echelle spectrograph: breaking the R=100,000 barrier from 1.5 to 5 $\mu$m, SPIE Conf. on Infrared Astronomical Instrumentation, Kona, Hawaii, Mar. 1998, Proceedings 3354, pp. 295–303.

Won–Tsien Tsang et al., Preferentially etched diffraction gratings in silicon, J. Appl. Phys., vol. 46, No. 5, May 1975, pp. 2163–2165.

Luke D. Keller et al., Fabrication and testing of chemically micromachined silicon echelle gratings, Applied Optics, vol. 39, No. 7, Mar. 1, 2000, pp. 1094–1105.

Yohji Fujii et al., Optical demultiplexer using a silicon echelle grating, IEEE JQE, vol. QU–16, No. 2, Feb. 1980, pp. 165–169.

S. Siram et al., Novel V–groove structures on silicon, Applied Optics, vol. 24, No. 12, Jun. 15, 1985, pp. 1784–1787.

* cited by examiner

*Primary Examiner*—Phan T. H. Palmer
(74) *Attorney, Agent, or Firm*—Ropes & Gray (57) ABSTRACT

A grating structure useful for WDM multiplexer/demultiplexer applications is described. The grating structure has a substantially polarization-independent diffraction efficiency of a predetermined useful wavelength range, for example, between 1.4 and 1.6 $\mu$m. Each grating period includes a triangular section and a flat-topped section, with the width of the flat-topped section between 20 and 50% of the grating period. The disclosed grating structure can be formed in any material that is substantially transparent over the useful wavelength range and used in either a Littrow and a Littman-Metcalf configuration.

19 Claims, 12 Drawing Sheets

Prior Art

DIFFRACTIVE STRUCTURE FOR HIGH-DISPERSION WDM APPLICATIONS

CROSS-REFERENCE TO OTHER PATENT APPLICATIONS

This application claims the benefit of U.S. provisional applications No. 60/286,801, filed Apr. 25, 2001, and No. 60/300,639, filed Jun. 25, 2001, which are incorporated herein by reference.

FIELD OF THE INVENTION

The invention is directed to an diffractive optical structure with a high angular dispersion and low stray light, and more particularly to a grating structure with a polarization-independent diffraction efficiency that can be applied in WDM applications.

BACKGROUND OF THE INVENTION

Fiber optic telecommunication systems are increasingly used to provide high-bandwidth transmission of information to homes and businesses. During the past decade, optical networks have become more complex and use multiple wavelengths transmitted simultaneously over the same fiber. This transmission method is referred to as wavelength division multiplexing/demultiplexing (WDM/D). The international telecommunications union (ITU) standards body has proposed a channel allocation grid with 100 GHz channel spacing (~0.81 nm at a 1550 nm wavelength) on even 100 GHz intervals, counting nominally in both directions from a center frequency of 193.1 THz. Newer systems are being designed to reduce the channel spacing to 50 GHz or less. In addition, the total wavelength range over which these devices are designed to operate is increasing. WDM is a general term applied to the separation and integration of information carried on these optical channels. The technologies involved in WDM/D require efficient handling of the optical signals propagating over fiber optic cables, and being routed through various devices that deliver the high bandwidth signals to the end customer.

To extract information from WDM channels, the various optical carrier frequencies propagating, for example, in a communication fiber, have to be separated. Wavelength-selective optical elements, such as interference filters, fiber Bragg gratings, arrayed waveguide gratings (AWG), and free space gratings, e.g., surface relief diffraction gratings, are employed for this purpose. Many of these wavelength-selective components have a polarization-sensitive response. The free-space gratings typically operates in a Littrow configuration. The gratings can be ruled gratings, holographic gratings or etched gratings. Etched gratings typically employ a crystalline, preferably a semiconductor substrate, that exposes crystal planes with a predetermined crystal orientation upon etching. For example, the (100) crystal planes in Si have a preferential etch rate of 400:1 over the Si (111) planes when etched with an aqueous solution of KOH.

It is well known that standard single-mode fiber may not preserve the launched state of polarization (SOP) of optical signals propagating through the fiber. Moreover, the SOP usually varies with time at any given point along the fiber due to small changes in the physical environment of the fiber or in the optical wavelengths. These random polarization fluctuations can affect transmission systems that employ polarization-sensitive optical components, such as optical amplifiers, coherent optical receivers or polarization-dependent photonic switches and demultiplexers. Polarization scramblers have recently been employed in optically amplified transoceanic communication systems, where they are used, for example, to eliminate anisotropic gain saturation (polarization hole burning) in the optical amplifiers by depolarizing the launched optical signal. Accordingly, optical components used with optical fibers should be made polarization independent, thereby reducing costs and complexity of the fiber-optic communications system.

It would therefore be desirable to provide compact wavelength-dispersive devices that can separate closely-spaced optical channels with equal efficiency regardless of the polarization direction of the light signal and with low crosstalk between channels.

SUMMARY OF THE INVENTION

The invention is directed to a grating structure for an optical multiplexer/demultiplexer which provides a substantially polarization-independent diffraction efficiency over a predetermined useful wavelength range. The diffraction grating has a surface relief structure with a repeating pattern consisting of triangular sections separated by flat sections. The structure can be used in both Littrow and Littman-Metcalf configuration.

According to one aspect of the invention, the optical multiplexer/demultiplexer having the grating structure according to the invention operates in "double-pass" geometry (Littman-Metcalf configuration) to provide a greater angular dispersion and a finer channel spacing, allowing a larger number of optical wavelength channels to operate over a fiber optic network. In addition, with this structure, the received signal is cleaner as a result of reduced contribution from stray light (reduced channel cross talk).

The optical multiplexer/demultiplexer includes a prism having an input face, an output face and a grating face, with a grating being formed either directly on or alternatively applied to the grating face. A reflecting surface is disposed substantially parallel to the output face. Incident optical radiation with a predetermined wavelength or wavelength range passes through the input face and is diffracted by the grating towards the output face. The reflecting surface retro-reflects the diffracted optical radiation back onto the prism for an additional diffraction by the grating. The twice diffracted light exits the input face of the prism at a wavelength-dependent angle relative to a surface normal of the input face.

According to another aspect of the invention, optical multiplexer/demultiplexer device for applications in fiber-optic communications includes at least one input optical fiber or waveguide, at least one output optical fiber or waveguide, and a prism with an input face, an output face and a grating face. Optical radiation with a predetermined wavelength or wavelength range emanating from the input optical fiber or waveguide can be collimated by an optical element, for example a lens, before impinging on the input face of the prism. A grating is formed either directly on or alternatively applied to the grating face. A reflecting surface is disposed substantially parallel to the output face. The incident optical radiation passes through the input face and is diffracted by the grating towards the output face. The reflecting surface retro-reflects the diffracted optical radiation back onto the prism for an additional diffraction by the grating. The twice diffracted light exits the input face of the prism at a wavelength-dependent angle relative to a surface normal of the input face.

The grating can be formed as an immersion grating in or on a material that is substantially transparent over the wavelength range of interest, such as glass, Si, Ge and the like. In addition, polarization rotation means, for example a quarter waveplate or a Faraday rotator, can be placed between the reflecting surface and the output face. The grating can be etched into silicon, wherein the natural etch planes of crystalline silicon, such as the (111) planes, form the sides of the triangles of the grating relief structure. The flat-topped region has a width between 20% and 50%, preferable between 25% and 35% of the grating period.

Further features and advantages of the present invention will be apparent from the following description of preferred embodiments.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to a wavelength-dispersive device suitable for multiplexing/demultiplexing optical carrier frequencies in WDM applications, and more particularly to grating structures with a substantially polarization-independent diffraction efficiency and reduced crosstalk over the wavelength range of interest for WDM.

Figure 1:
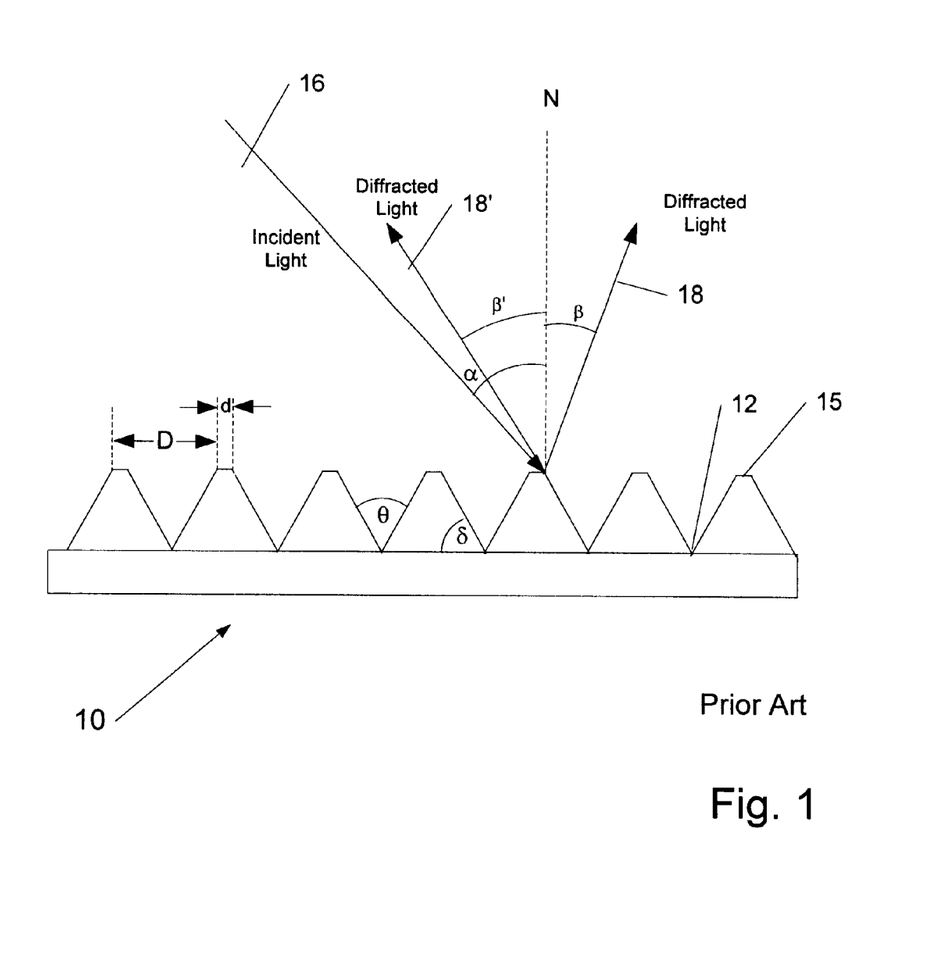
FIG. 1 shows schematically a conventional triangular grating structure, with the triangular sections separated by flat sections.

Referring first to FIG. 1, a triangular grating structure 10 includes triangular sections 12 which are separated by flat sections 15. Light 16 is incident on the grating structure 10 at an angle of incidence α with respect to the surface normal N; the diffracted light 18, 18' exits with respective angles of diffraction β, β'. The angles α and β are related to one another by the formula:

$$M\lambda/nD = \sin\alpha \pm \sin\beta$$

wherein:
M=order of diffraction,
λ=wavelength of interest,
n=index of refraction of material where light interacts with groove structure,
D=distance between successive grooves (groove spacing),
α=angle of incidence measured relative to grating surface normal, and
β=angle of diffraction measured relative to grating surface normal.

Dispersion takes place when the incident light, containing all of the wavelengths of interest (sometimes called channels in telecommunication), interacts with a diffraction grating. The equation can be applied to both transmission gratings and reflection gratings, with the "+" sign in the equation applying to a reflection grating and the "−" sign to a transmission grating when the incident and reflected beams are on the same side of the grating surface normal. Otherwise, the signs are reversed. The light beam incident on the grating surface is assumed to be collimated, i.e., all rays of the incoming light beam arrive with the same angle of incidence α regardless of wavelength.

After diffraction by the grating and for the same angle of incidence α, light with different wavelengths will leave the grating at different angles β. The angular dispersion dβ/dλ obeys the following equation:

$$d\beta/d\lambda = (\sin\alpha + \sin\beta)/\lambda\cos\beta.$$

According to this equation, the angular dispersion or "spread" between wavelengths increases with the angle α of the incident beam 16.

Gratings of the type depicted in FIG. 1 are known in the art (Tsang et al., J. Appl. Phys., Vol. 46, No. 5, pp. 2163–2165 (1975)). Keller et al. (Applied Optics, Vol. 39, No. 7, pp. 1094–1105 (2000)) reported that the unblazed stripes 15 between the grooves 12 reflect/diffract a portion of the light incident on the grating that is proportional to the relative area covered by the stripes. Graf et al. (Applied Optics, Vol. 33, No. 1, pp. 96–102 (1994)) presented experimental and calculated diffraction efficiencies for an etched grating with flat groove tops and flat groove bottoms. However, none of the references suggests that having a relatively wide section 15 could have beneficial effects and/or that variations in the width d of the flat sections 15 could produce a substantially polarization-independent diffraction efficiency over a wavelength range useful for WDM optical communication.

Returning to FIG. 1, when the grating is etched in (100) Si (i.e., the (100) crystal axis is parallel to the surface normal N), the apex angle θ is fixed at approximately 70° (which is equal to the angle formed between two (111) crystal etch planes), and the base angle δ is approximately 50°. The base angle can be changed by cutting the Si crystal with a different orientation, as is known in the art. The grating period can be selected independent of the width d of the flat section 15.

Figure 2:
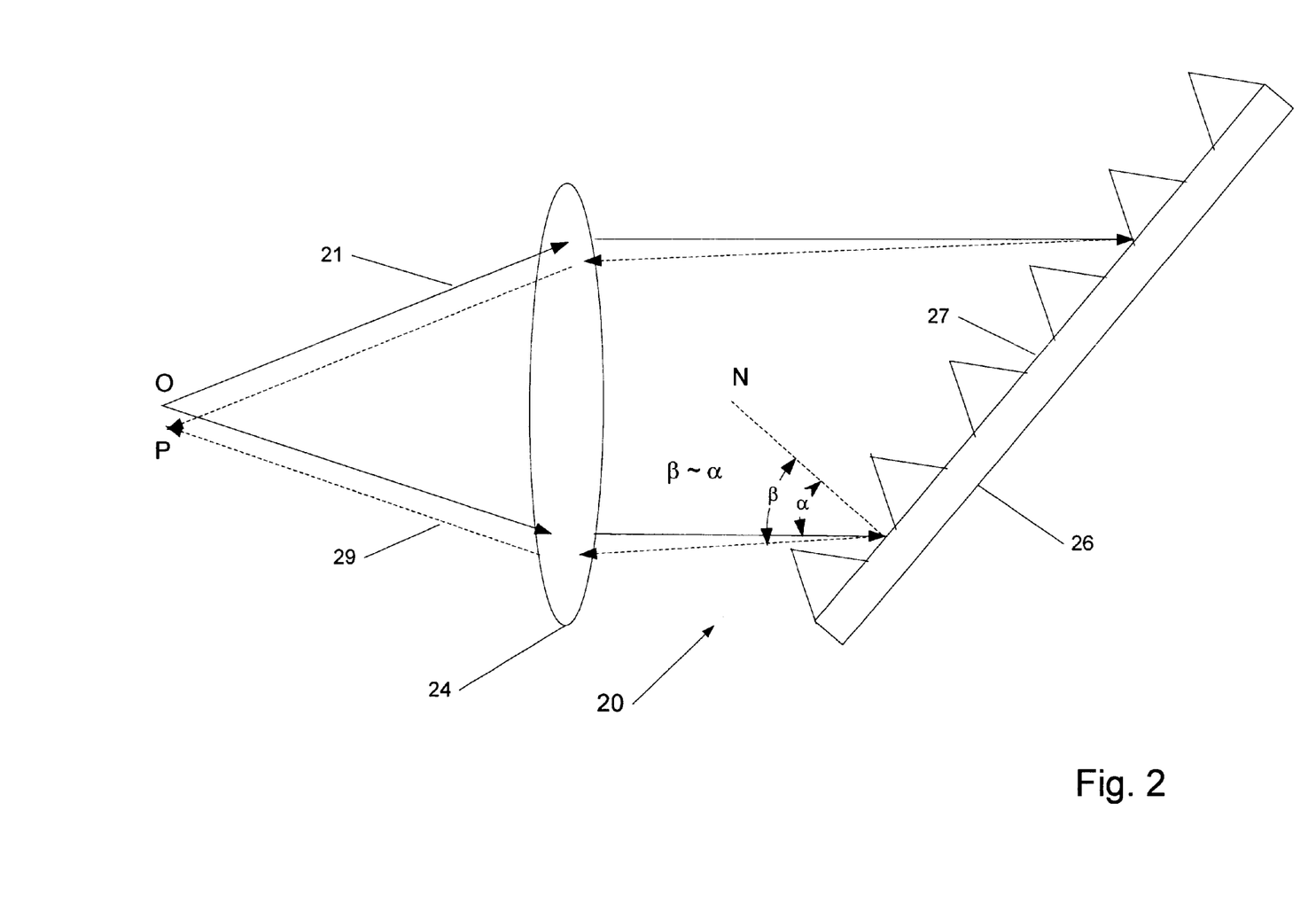
FIG. 2 shown schematically a free space grating in Littrow configuration.

FIG. 2 depicts a free space grating 26 of the type described in FIG. 1 in Littrow configuration 20. Unlike the grating 10 of FIG. 1, the grating 26 in FIG. 2 has relatively wide flat-bottomed regions 27. The benefit of the flat-topped and flat-bottomed regions which function in an essentially equivalent manner, will be described in greater detail below. Incident light 21 is collimated by a lens 24 and is incident on the grating 26 at an angle α with respect to the grating surface normal N. The angle of incidence α is adjusted for a specified center wavelength to be approximately equal to the angle of diffraction β. The collimated diffracted light is focused by the lens 24 to form a focused light beam 29. The amount of angular dispersion is $d\beta/d\lambda = 2*\tan(\beta)/\lambda$. With a suitable choice of grating design parameters, a Littrow configuration can provide a high dispersion and a substantially polarization-independent diffraction efficiency.

Figure 2A:
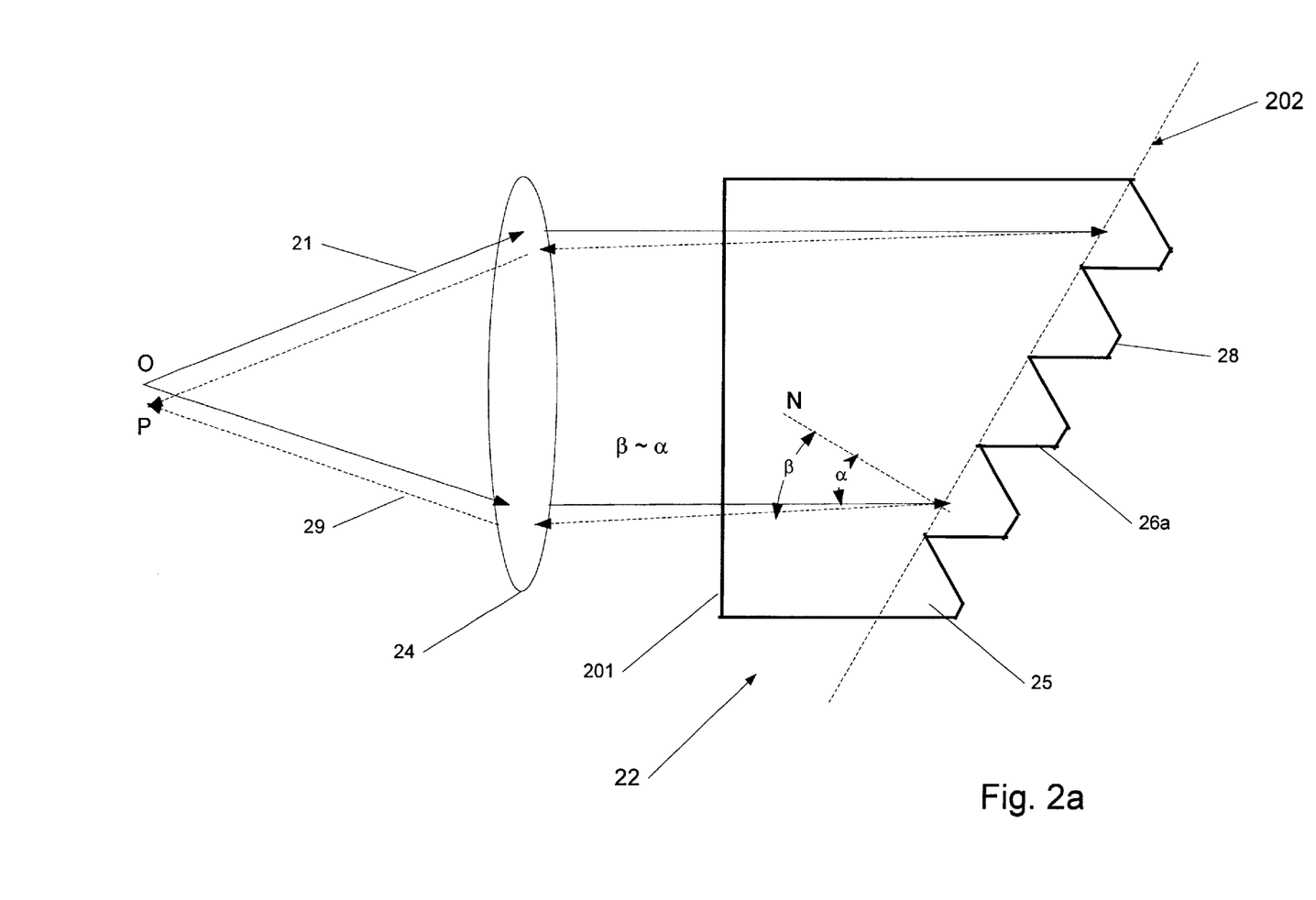
FIG. 2a shown schematically an immersion grating with integrally formed grating structure in Littrow configuration.

As illustrated in FIG. 2a, a Littrow configuration 22 can be implemented by forming a grating 26a as an immersion grating on a surface of a prism 25. The prism can be made of any suitable material that is transparent for the wavelength range of interest. For example, BK-7 glass (n=1.5) and Si (n=3.5) can be used for optical communication wavelengths between λ=1.4 μm and λ=1.6 μm.

In the embodiment of FIG. 2a, the prism 25 of multiplexer/demultiplexer 22 has an input face 201 and a grating face indicated by the imaginary dotted line 202. An incident beam 21 which can originate, for example, from an optical communication fiber (not shown in FIG. 2a; see, for example, FIG. 3) having an exit face located at point O, is collimated by a lens 24 and strikes the input face 201 of the prism 25. The light 21 is incident on the grating 26a at an angle α with respect to the grating surface normal N and diffracted by the grating 26a with a wavelength-dependent diffraction angle β, wherein β is a function of the wavelength. The diffracted beam exits through face 201, passes again through the collimating lens 24 and is focused onto a respective output point P whose position depends on the wavelength. It will be understood that the actual location of the point P relative to the input O depends on the specific design and orientation of the prism. One or more optical fibers (not shown) can be placed at points P, with each fiber receiving demultiplexed optical radiation with a specific wavelength. As mentioned above, the dispersion of the immersion grating 26a is greater than that of the free space grating 26 by the index of refraction of the prism 25. It has been observed that the grating in Littrow configuration has a substantially wavelength-independent and polarization-independent diffraction efficiency if the width of the flat-topped regions 27 (FIG. 2) and 28 (FIG. 2a), respectively, is between 20% and 50%, preferably between 25% and 35%, of the grating period.

Figure 3:
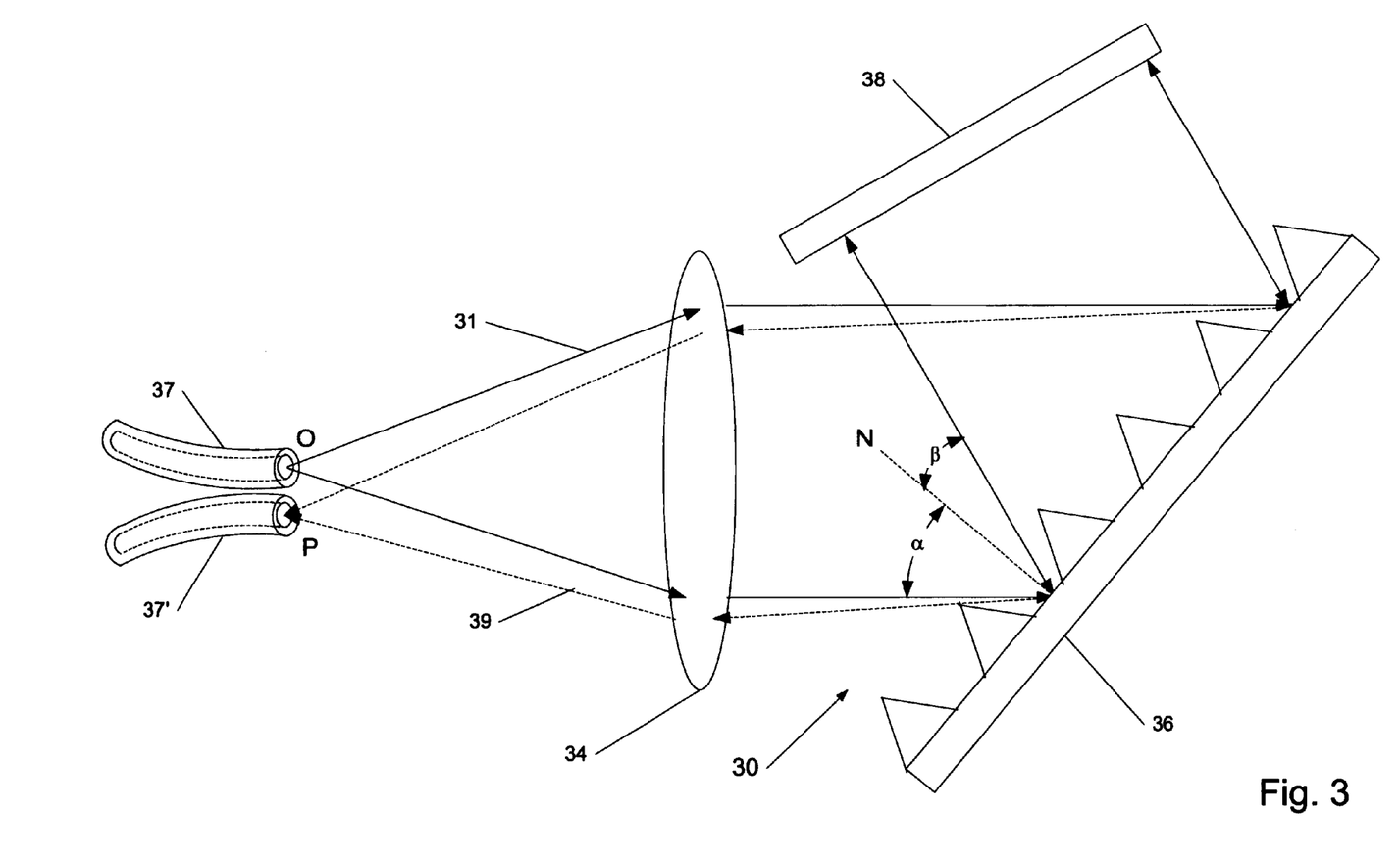
FIG. 3 shown schematically a free space grating in Littman-Metcalf configuration.

Referring now to FIG. 3, in an exemplary Littman-Metcalf configuration 30, light 31 originating at at least one point O, for example, an exit facet of an optical fiber or optical waveguide 37, is collimated by a lens 34 is incident on the grating 36 at an angle α with respect to the grating surface normal N. The incident light is diffracted with a diffraction angle β and reflected back onto the grating 36 by a mirror 38, where the reflected light beam is diffracted a second time. The twice diffracted beam then passes once more through the collimating lens 34 and emerges as beam 39 with a direction that depends on the wavelength of the diffracted beam. Light beam 39 is focused at a point P, which can likewise be an entrance facet of at least one other optical fiber or waveguide 37. By using a plurality of optical fibers/waveguides 37, 37', this arrangement can be used for multiplexing/demultiplexing optical carriers in multi-wavelength optical transmission systems, as is known in the art. Optical fibers and waveguides, respectively, can be placed at the focal points of all embodiments of the diffractive structures described with reference to FIGS. 2–6. The Littman-Metcalf configuration 30, operating in a "double-pass" geometry, can attain a higher angular dispersion than a corresponding Littrow configuration 20 with a smaller blaze angle.

The Littman-Metcalf configuration 30 requires precise alignment between the orientation of the grating 36 and that of the mirror 38.

Figure 4:
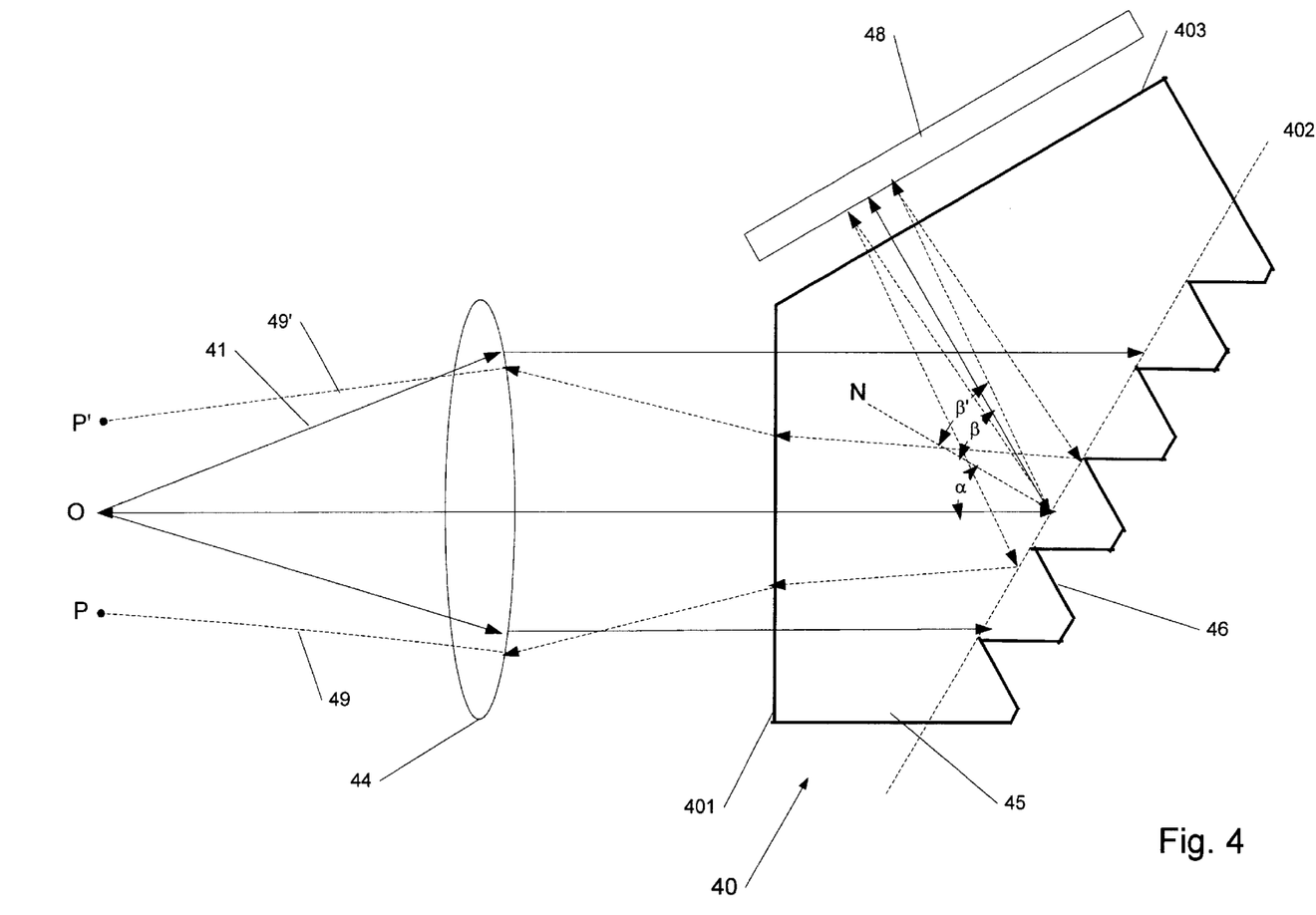
FIG. 4 shows an embodiment of an immersion grating with integrally formed grating structure in Littman-Metcalf configuration.

As illustrated in FIG. 4, a Littman-Metcalf configuration 40 can be implemented by forming a grating 46 as an immersion grating on a surface of a prism 45, which in the illustrated example has the shape of a pentaprism. It will be understood that the prism can also be a 3-sided prism and that the design of the prism can be adapted to particular application, prism material and wavelength range.

The prism can be made of any suitable material that is transparent for the wavelength range of interest. For example, BK-7 glass (n=1.5) and Si (n=3.5) can be used for optical communication wavelengths between λ=1.4 μm and λ=1.6 μm.

In the embodiment of FIG. 4, the prism 45 of multiplexer/demultiplexer 40 has an input face 401, a grating face indicated by the imaginary dotted line 402 and an output face 403. An incident beam 41 which can originate, for example, from an optical communication fiber (not shown) having an exit face located at point O, is collimated by a lens 44 and strikes the input face 401 of the prism 45. The light 41 is incident on the grating 46 at an angle α with respect to the grating surface normal N and diffracted by the grating 46 with a wavelength-dependent diffraction angle β, β', wherein β and β' are different diffraction angles for different exemplary wavelengths. The respective diffracted beams pass through output face 403 and are retro-reflected by a mirror 48 back onto the grating 46, where the retro-reflected light beams are diffracted a second time. The respective twice-diffracted beams 49, 49' exit through face 401, pass through the collimating lens 44 and are focused onto respective output points P, P' whose position depends on the wavelength. It will be understood that the actual location of the points P, P' relative to the input O depends on the specific design and orientation of the prism. Optical fibers (not shown) can be placed at points P, P', with each fiber receiving demultiplexed optical radiation with a specific wavelength. As mentioned above, the dispersion of the immersion grating 46 is greater than that of the free space grating 36 by the index of refraction of the prism 45.

The system 40 can also be used to combine (multiplex) several wavelengths emanating from points P, P' into a common fiber located at point O. Moreover, the mirror 48 can either be implemented as a separate mirror or can be formed integrally (not shown) with the prism 45. The light-transmitting surfaces of the prism 45 and the lens 44 can be AR-coated, as is known in the art.

As mentioned above and to be discussed below in more detail, the diffraction efficiency of gratings typically depends on the polarization direction of the incident light. As illustrated in the system 50 depicted in FIG. 5, the polarization-dependent effects can be lessened by inserting a polarization rotator 52, for example a quarter waveplate or a Faraday rotator, in the path of the diffracted beams between the mirror 48 and the grating 46. The beam diffracted by the grating 46 passes through the quarter-waveplate 52, is reflected by mirror 48, passes a second time in the reverse direction through the quarter-waveplate 52 and strikes the grating 46 again. Since the quarter-waveplate 52 (or Faraday rotator) is a non-reciprocal device, the optical signal passing therethrough will experience a "+45°" rotation during each traversal, thereby interchanging the "S" and "P" polarization directions. Accordingly, the diffraction efficiency of the grating for either S- or P-polarization will be the product of the respective S- and P-diffraction efficiencies. It will be understood that a "quarter waveplate" includes all odd multiples of a ¼-waveplate. Specific examples will be given below. In all other aspects, the system 50 operates in the same manner as the system 40 of FIG. 4.

Figure 5:
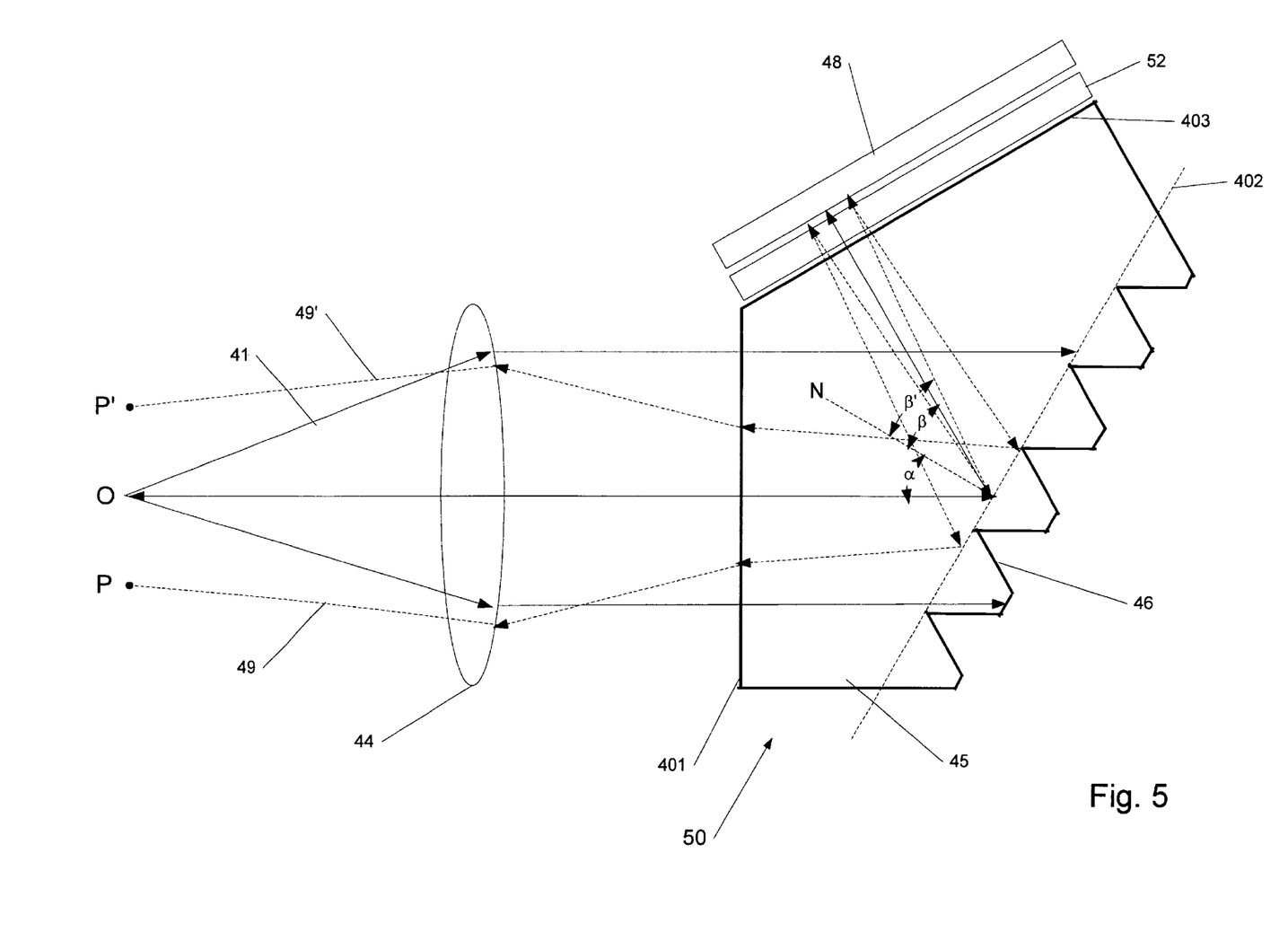
FIG. 5 shows another embodiment of an immersion grating with a separately formed grating structure in Littman-Metcalf configuration.
Figure 6:
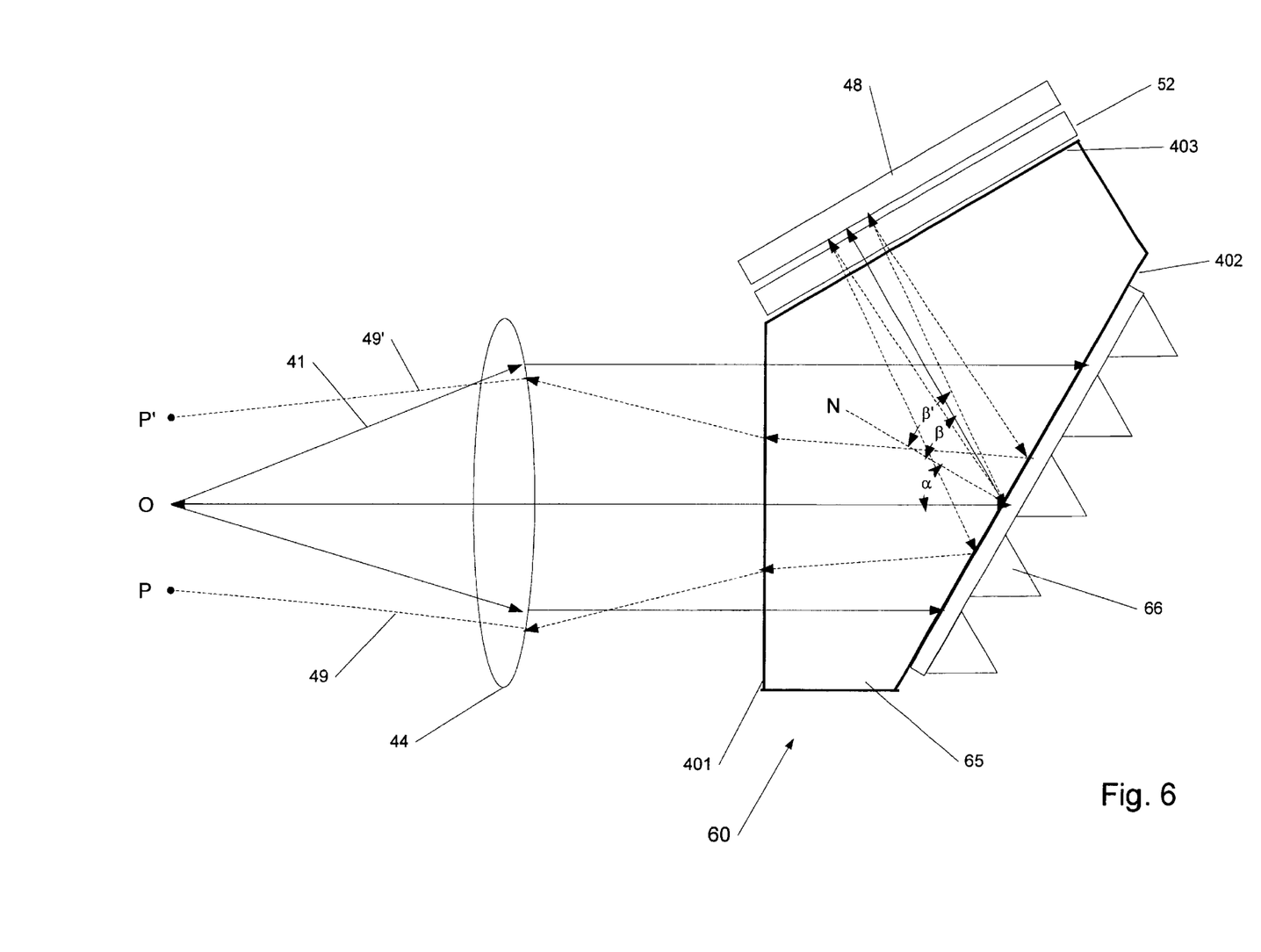
FIG. 6 shows another embodiment of an immersion grating with polarization rotation means in Littman-Metcalf configuration.

In another exemplary embodiment 60 depicted in FIG. 6, unlike the embodiments 40 and 50 of FIGS. 4 and 5, respectively, where the grating 46 was formed integrally with the prism face 402, the prism face 402 of embodiment 60 is smooth, and a separate grating structure 66 is placed in close contact with the smooth prism surface 602. The separate grating structure 66 can be made of another material, such as a resin or optical cement. The efficiency of the grating in all the aforedescribed embodiments can be improved further by coating the surface of the gratings 66, 66' facing away from the prism surface 402 with a reflective layer, e.g., a gold layer (not shown), as is known in the art. The separate grating can be implemented with either with or without using a quarter-waveplate. In all other aspects, the system 60 operates in the same manner as the system 40 of FIG. 4.

As mentioned above, providing a grating structure with a substantially polarization-independent diffraction efficiency over a predetermined spectral range of interest is important for WDM optical communication applications. Although the diffraction efficiency of etched gratings with flat-topped grooves has been reported for S-polarized, P-polarized and unpolarized light (Graf et al., cited above), there has been no suggestion for providing useful grating design parameters and grating configurations that substantially eliminate polarization-dependent diffraction effects.

Figure 7:
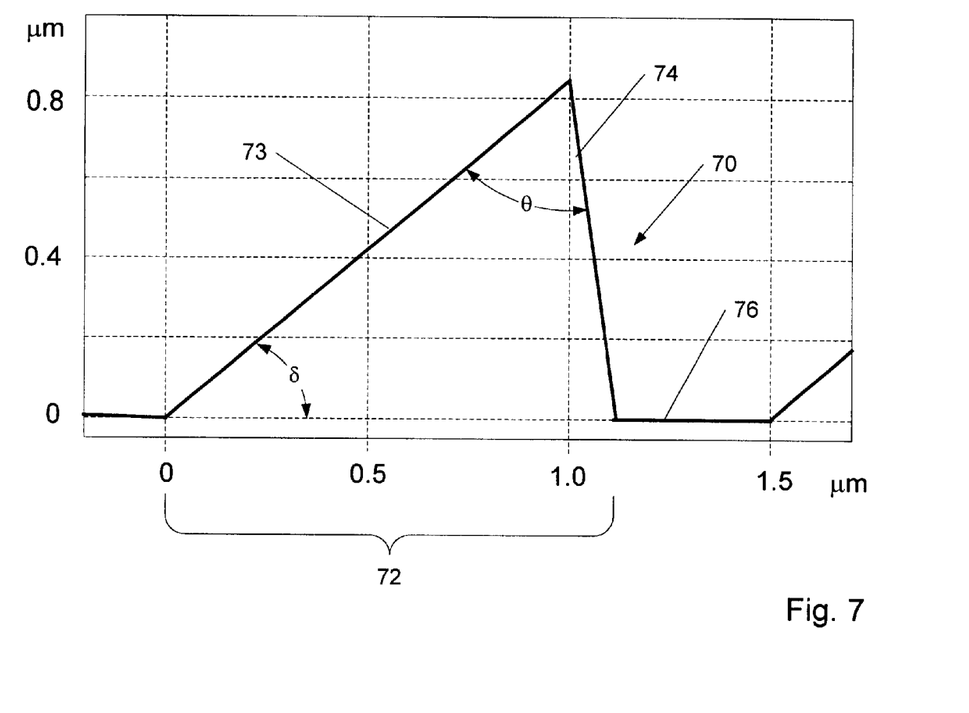
FIG. 7 shows a particular free space grating with reduced polarization sensitivity.

Referring now to FIG. 7, an exemplary cross-sectional profile of particular free space grating structure 40 which provides the desired polarization-independent high diffraction efficiency when operated in a double-path Littman-Metcalf configuration (see FIG. 3) in air, is composed a triangular section 72 and a flat-topped section 76. The combination of sections 72 and 76 form the grating period which repeats periodically to form, for example, the grating 36 (see FIG. 2). The dimensions of the optimized free space grating 70 are as follows:

Rising side 73 of triangle:

| | |
|---|---|
| Length (projected distance across grating surface): | 1.00 μm, |
| Height (from baseline 76): | 0.84 μm; |

Falling side 73 of triangle:

| | |
|---|---|
| Length (projected distance across grating surface): | 0.125 μm, |
| Height (from baseline 76): | 0.84 μm; |

Flat section 76:

| | |
|---|---|
| Length (across grating surface): | 0.38 μm; |
| Grating period: | 1.50 μm (or ~660 grooves/mm). |

The corresponding groove angle (blaze angle) is 40° and the apex angle 58.5°. This grating can be fabricated, for example, by conventional ruling techniques.

Figure 8:
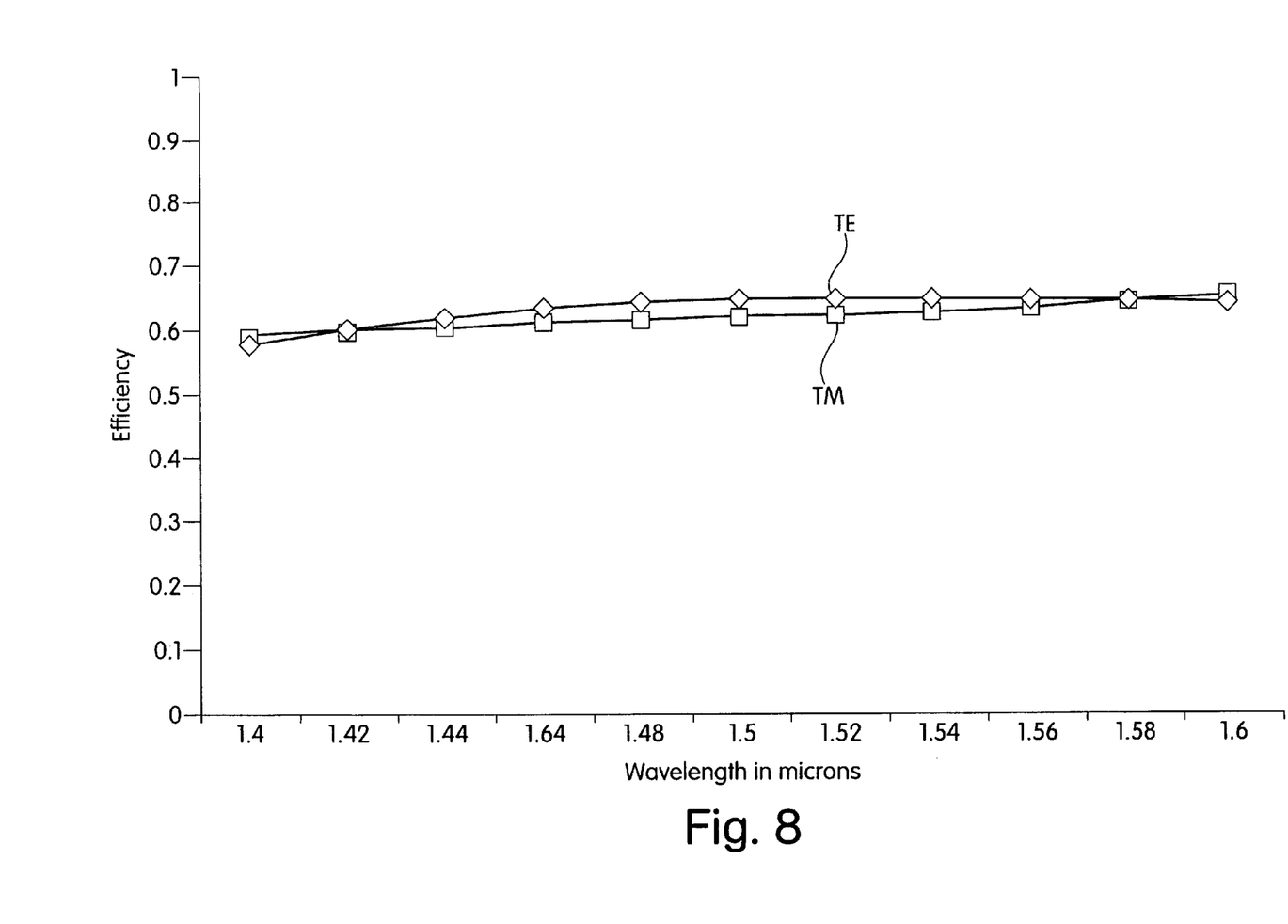
FIG. 8 shows the diffraction efficiency of the grating of FIG. 4 for S- and P-polarization directions (single pass)

FIG. 8 shows the diffraction efficiency of the grating structure of FIG. 7 in the wavelength range between 1.4 μm and 1.6 μm for two orthogonal polarization directions TE and TM. The angle of incidence α is 46° which is close to the calculated blaze angle of ~40°. As seen from FIG. 8, the diffraction efficiency is approximately 0.6–0.65 and substantially independent of the polarization (TE/TM) over the useful wavelength range of 1.4–1.6 μm.

Figure 9:
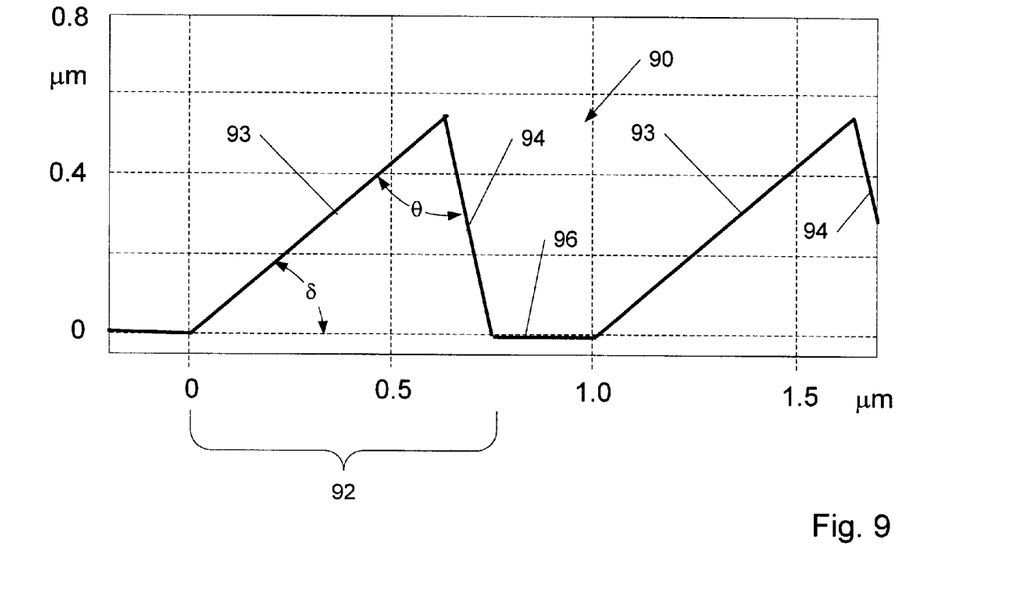
FIG. 9 shows an immersion grating with reduced polarization sensitivity formed in glass (n=1.5)

FIG. 9 shows an optimized grating profile when the grating is operated as an immersion grating (illustrated in FIGS. 3–5) instead of the free space grating depicted in FIG. 3. The dimensions of the groove and the flat-topped sections scale inversely with the index of refraction of the material of the prism 65, i.e., the linear dimensions are decreased by a factor 1.5 for a BK-7 glass prism relative to those of FIG. 7.

The dimensions of the optimized free space grating 90 are as follows:

Rising side 93 of triangle:

| | |
|---|---|
| Length (projected distance across grating surface): | 0.67 μm, |
| Height (from baseline 96): | 0.56 μm; |

Falling side 73 of triangle:

| | |
|---|---|
| Length (projected distance across grating surface): | 0.08 μm, |
| Height (from baseline 76): | 0.56 μm; |

Flat section 76:

| | |
|---|---|
| Length (across grating surface): | 0.25 μm; |
| Grating period: | 1.0 μm (or 1,000 grooves/mm). |

Figure 10:
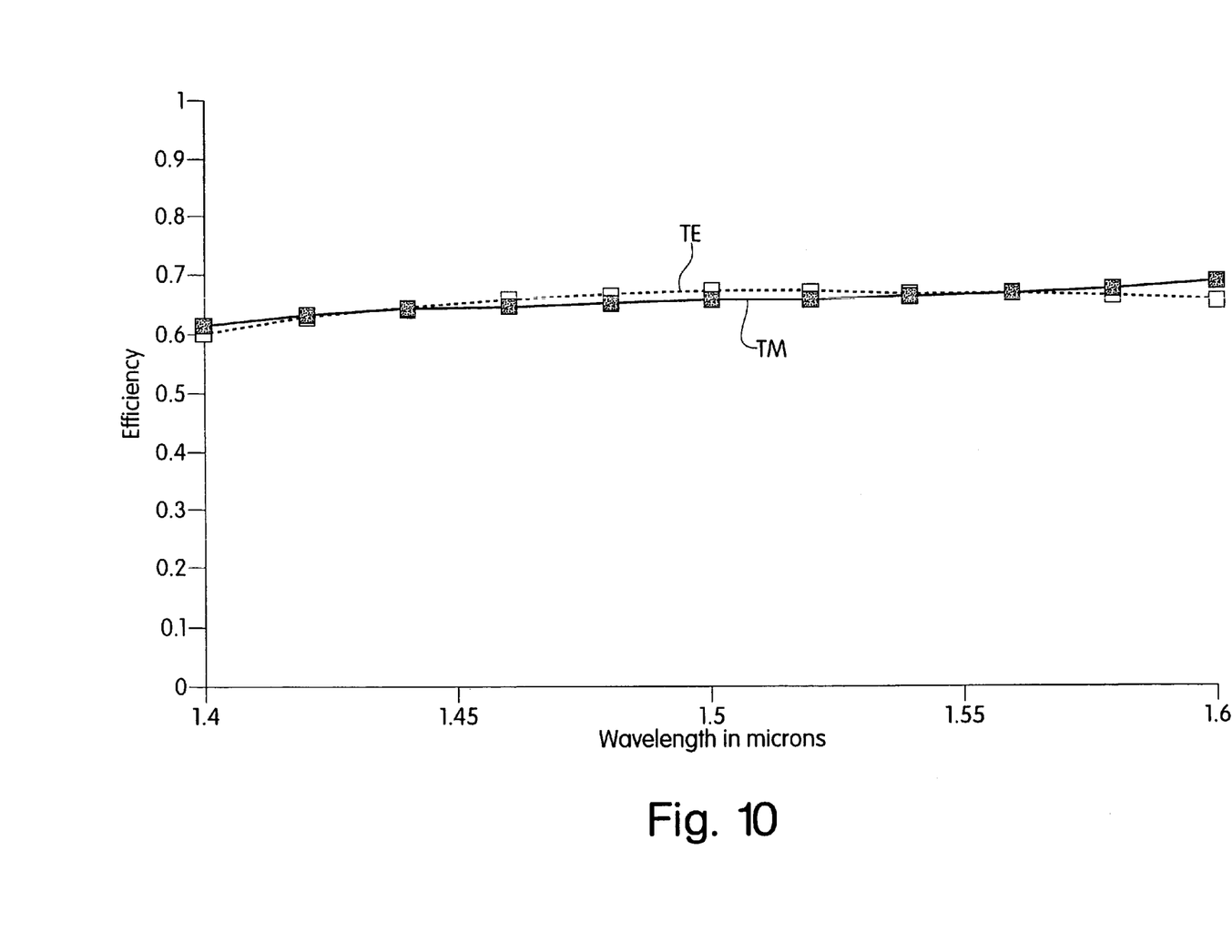
FIG. 10 shows the diffraction efficiency of the immersion grating of FIG. 9 for S- and P-polarization directions (double pass; Littman-Metcalf configuration)

The groove angle and apex angles are identical to those of FIG. 7. As seen from FIG. 10, the diffraction efficiency is substantially independent of the polarization directions (TE/TM) between 1.4 μm and 1.6 μm.

When a grating structure is etched into silicon, the apex angle is defined by the etch pattern of the silicon crystal, such as the angle enclosed between two (111) crystal planes, which is 70.5°. As described above, the groove angle (blaze angle) can be varied by cutting the crystal at a suitable angle from the (100) crystal orientation.

Figure 11:
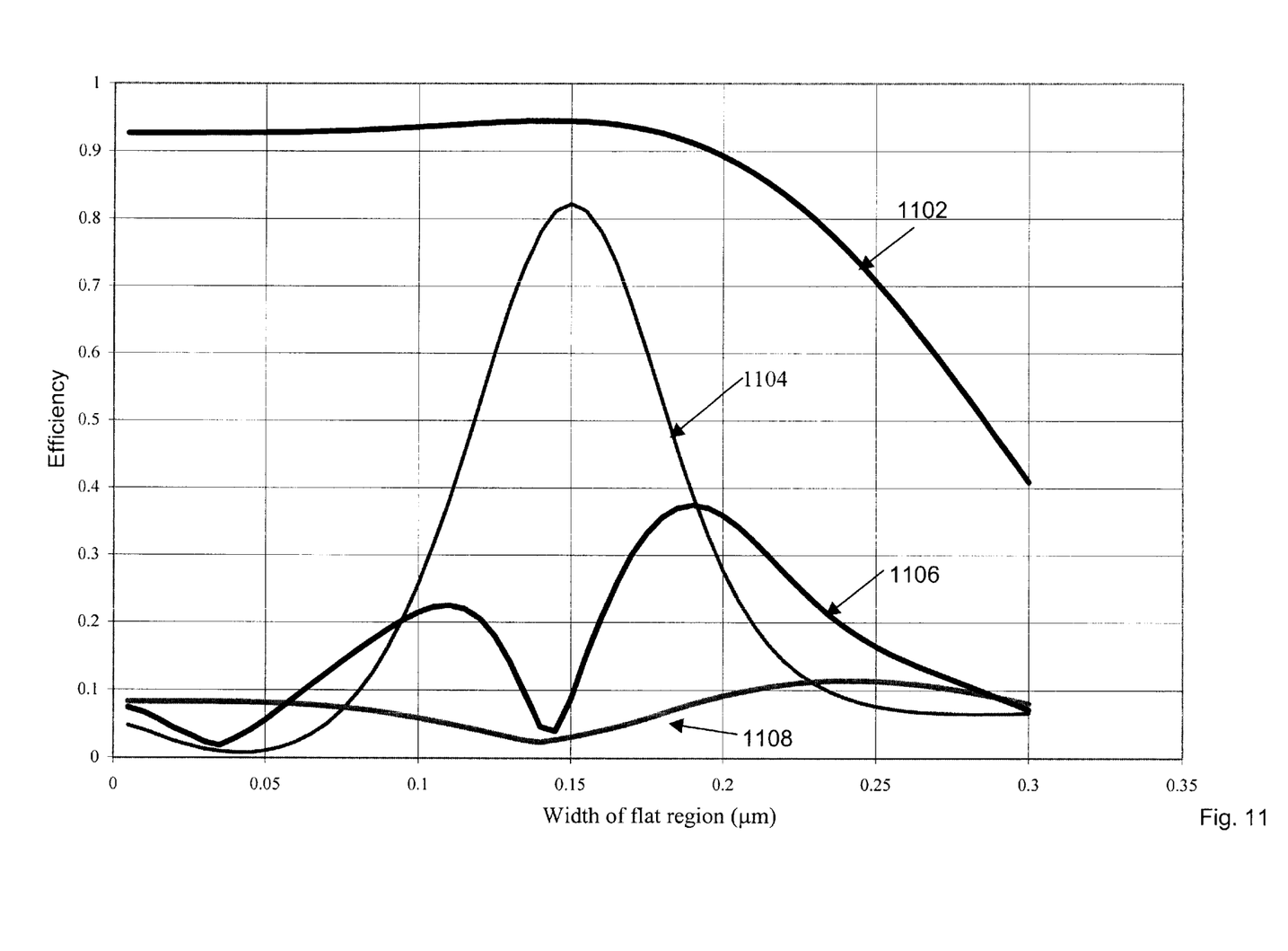
FIG. 11 shows the S- and P-polarization diffraction efficiency of a silicon immersion grating as a function of the length of the flat section.

Referring now to FIG. 11, the diffraction efficiency of a Si immersion grating (n≡3.5) with a grating period of 0.45μm was modeled in double-path (Littman-Metcalf) configuration (see FIGS. 4–6) for incident optical radiation in the wavelength range between 1.4 μm and 1.6 μm. The grating period of 0.45 μm is approximately equal to the average free space wavelength of $\lambda_{air}$=1.5 μm in Si ($\lambda_{Si}$=$\lambda_{air}$/n=1.5/3.5= 0.43 μm). The exemplary symmetric groove structure is similar to that depicted in FIG. 4 (which corresponds to the inverted structure of FIG. 1), with an apex angle of θ=70.5° and two identical groove angles of δ=54.75°. An angle of incidence of α=28.96° was selected, yielding an approximately identical angle β of the diffracted beam of β=28°.

Curve 1102 of FIG. 11 represents the mean value (averaged over the 1.4–1.6 μm wavelength range) of the diffraction efficiency for P-polarized incident light (TE) as a function of the width d of the flat-topped section 14. As seen in FIG. 11, the mean diffraction efficiency for P-polarization has an approximately constant value of 0.93–0.95 for 0<d<0.18 μm. Conversely, the diffraction efficiency for S-polarized incident light (TM) as a function of d, depicted in curve 1104, has a relatively sharp maximum of 0.82 for d=0.148 μm and decreases precipitously towards both smaller and greater values of d.

Curve 1106 depicts the absolute value of the difference between the maximum and minimum diffraction efficiency for P-polarization, abs(max(TE)−min(TE)), whereas curve 1108 depicts the absolute value of the difference between the maximum and minimum diffraction efficiency for S-polarization, abs(max(TM)−min(TM)), both averaged over the 1.4–1.6 μm wavelength range. As seen from an inspection of curves 1102 and 1104, the mean diffraction efficiency for P-polarization is identical to the mean diffraction efficiency for S-polarization to within 15% for d=0.148 µm. Equally important, as seen from an inspection of curves 1106 and 1108, the P- and S-diffraction efficiency is substantially independent of wavelength, varying only by approximately 0.03 (=4%) or for S-polarization and 0.04 (=4%) for P-polarization over the 1.4–1.6 µm wavelength range. In other words, when the diffraction efficiency for a Si immersion grating with the above parameters is plotted as a function of wavelength between 1.4 and 1.6 µm, the diffraction efficiency curves for S- and P-polarized light will look very similar to the corresponding curves plotted in FIG. 10. Any residual difference between the S- and P-polarization diffraction efficiencies of the grating can be further compensated in a manner known in the art by placing, for example, a tilted glass plate (not shown) in the optical path between the lens 24, 34, 64 and the grating 26, 36, 66, respectively.

Figure 12:
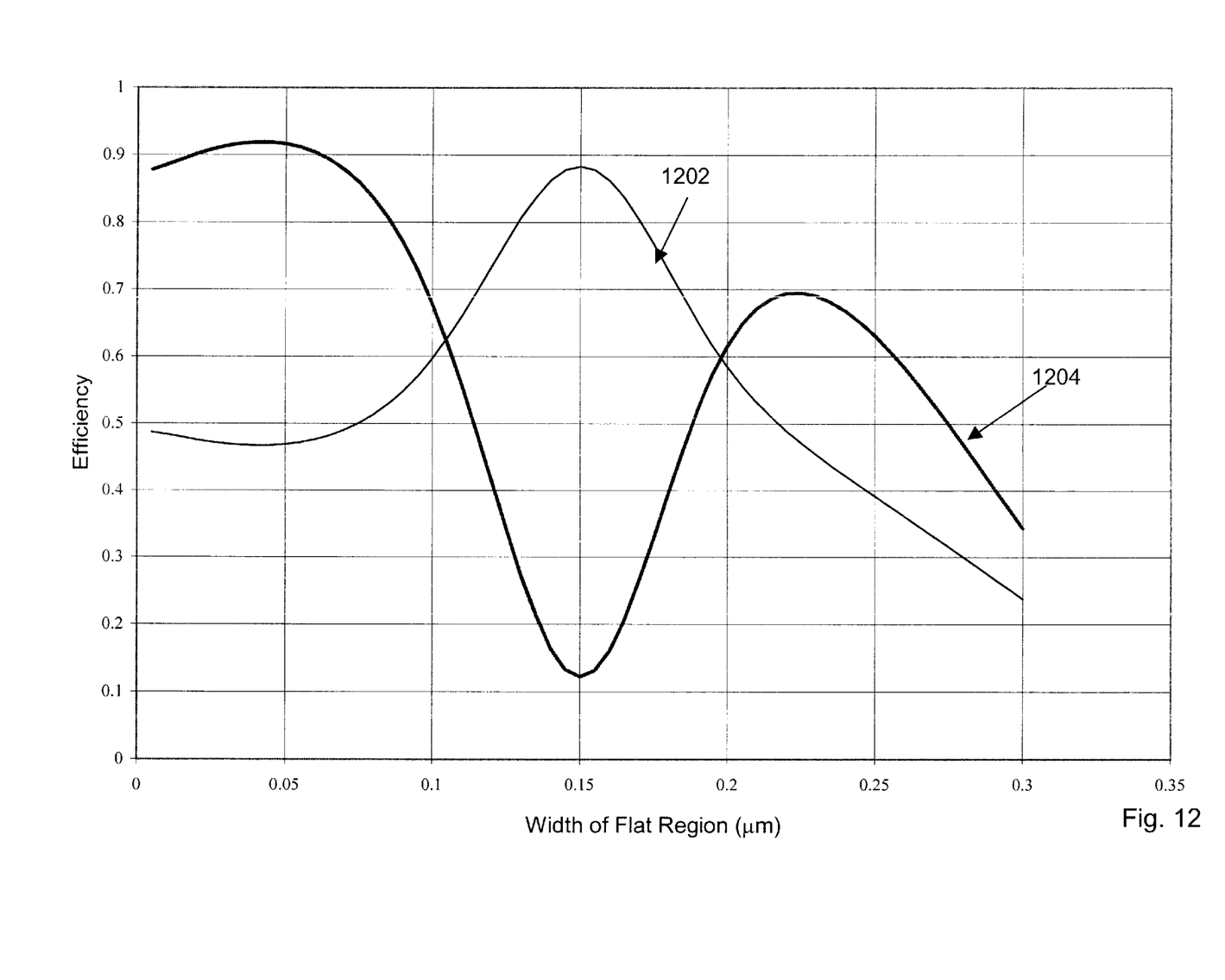
FIG. 12 shows the product of the S- and P-polarization diffraction efficiencies of the grating of FIG. 11.

Referring now to FIG. 12, curve 1202 represents the average value of the means of the S- and P-polarization efficiencies (mean(P)+mean(S))/2 of curves 1102 and 1104. Curve 1204 of FIG. 12 represents the absolute difference between the means of the S- and P-polarization efficiencies abs(mean(P)−mean(S)) of curves 1106 and 1108. Curve 1202 has a pronounced maximum for a width of the flat-topped section of d=0.148 µm, with curve 1204 exhibiting a pronounced minimum at the same value of d. The shape of these curves 1202 and 1204 support the conclusion reached above, that an immersion grating can be etched in silicon with a diffraction efficiency that is substantially constant and independent of the polarization direction over a wavelength range useful for optical communication. Such grating design is compact and suitable for a Littman-Metcalf-type WDM multiplexer/demultiplexer.

It should be pointed out that the optimum performance is achieved with a width d of the flat-topped section 15 that is approximately ⅓ of the grating period. The width of the flat-topped section of previously reported etched silicon gratings did not exceed approximately 10% of the grating period. Wide flat-topped sections were previously deemed undesirable because the unblazed stripes tend to degrade the overall diffraction efficiency. However, the present invention demonstrates that a grating with a combination of triangular sections and comparatively wide flat-topped regions can have a substantially constant and polarization-independent diffraction efficiency.

In summary, exemplary grating structures having a high and substantially polarization-independent diffraction efficiency over a broad wavelength range have been described. The grating structures can be employed in WDM/D applications either in single-pass or double-pass configuration. The structure can be made compact if the grating is formed as an immersion grating in a medium with a high index of refraction that is substantially transparent to optical radiation in the desired wavelength range, such as glass, silicon, germanium or GaAs. The increased free space dispersion on an immersion grating in Littman-Metcalf configuration can also decrease the channel spacing in fiber optic cables. This can be achieved without increased cost or complexity of polarization control devices.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. An optical multiplexer/demultiplexer comprising:
   a prism having an input face, an output face and a grating face,
   a grating formed on said grating face,
   a reflecting surface disposed substantially parallel to the output face,
   wherein incident optical radiation having a predetermined wavelength or wavelength range passes through the input face and is diffracted by the grating towards the output face, said reflecting surface retro-reflecting the diffracted optical radiation onto the prism for an additional diffraction by the grating, said twice diffracted light exiting the input face of the prism at a wavelength-dependent angle relative to a surface normal of the input face.

2. The optical multiplexer/demultiplexer of claim 1, wherein the grating comprises a pattern alternating between a triangular-shaped section and a flat-topped section, with a combined length of a flat-topped section and the base of a triangular-shaped section defining a grating period.

3. The optical multiplexer/demultiplexer of claim 2, wherein the flat-topped region has a width between 20% and 50% of the grating period.

4. The optical multiplexer/demultiplexer of claim 3, wherein the flat-topped region has a width between 25% and 35% of the grating period.

5. The optical multiplexer/demultiplexer of claim 2, wherein the prism is made of silicon, and the triangles have sides with a (111) crystal orientation.

6. The optical multiplexer/demultiplexer of claim 1, wherein the grating period is selected so that optical radiation entering the input face substantially normal to the input face is diffracted in a direction so as to impinge on the output face substantially normal to the output face.

7. The optical multiplexer/demultiplexer of claim 1, wherein the prism is made of a material that is substantially transparent in the wavelength or wavelength range of the incident optical radiation.

8. The optical multiplexer/demultiplexer of claim 7, wherein the material is glass.

9. The optical multiplexer/demultiplexer of claim 7, wherein the material comprises a semiconductor selected from the group consisting of silicon, germanium and GaAs.

10. The optical multiplexer/demultiplexer of claim 1, further comprising polarization rotation means interposed between the reflecting surface and the output face.

11. The optical multiplexer/demultiplexer of claim 10, wherein the polarization rotation means comprise a quarter waveplate or a Faraday rotator.

12. The optical multiplexer/demultiplexer of claim 1, wherein the grating is formed separate from the prism and placed proximate to the grating face of the prism.

13. The optical multiplexer/demultiplexer of claim 12, wherein the grating is formed separate from the prism and placed in contact with the grating face of the prism.

14. The optical multiplexer/demultiplexer of claim 1, wherein the grating is formed integrally with the prism.

15. An optical multiplexer/demultiplexer device comprising
   at least one first waveguide;
   at least one second waveguide;
   a prism comprising an input face, an output face and a grating face,
   said input face receiving from said at least one first waveguide optical radiation having a predetermined wavelength or wavelength range;

a grating disposed on said grating surface and diffracting said received optical radiation towards the output face; and a reflective surface so that the diffracted optical radiation is retro-reflected by said reflective surface towards the grating and diffracted again by said grating, with the twice-diffracted optical radiation exiting the prism through the input face and received by the at least one second waveguide;

wherein the grating comprises a pattern alternating between a triangular-shaped section and a flat-topped section, with a combined length of a flat-topped section and the base of a triangular-shaped section defining a grating period, wherein the grating period is substantially identical to the wavelength propagating in the prism, and wherein the flat-topped section has a width of between 20% and 50% of the grating period.

16. The device of claim 15, further comprising polarization rotation means disposed between the grating and the reflective surface, the polarization rotation means causing a polarization mode conversion between the received optical radiation and the twice-diffracted optical radiation.

17. The device of claim 15, further comprising an optical element which collimates the optical radiation received from said at least one first waveguide and focuses the twice-diffracted optical radiation exiting the prism onto the at least one second waveguide.

18. An optical multiplexer/demultiplexer comprising:

a prism having at least an input face and a grating face, and a grating formed on said grating face and having a grating pattern alternating between a triangular-shaped section and a flat-topped section, with a combined length of a flat-topped section and the base of a triangular-shaped section defining a grating period, wherein incident optical radiation having a predetermined wavelength or wavelength range passes through the input face and is diffracted by the grating so as to exit the input face at a wavelength-dependent angle relative to a surface normal of the input face, and wherein the flat-topped region has a width between 20% and 50% of the grating period.

19. The optical multiplexer/demultiplexer of claim 18, wherein the flat-topped region has a width between 25% and 35% of the grating period.

* * * * *